United States Patent [19]

Ruddy

[11] Patent Number: 4,749,866

[45] Date of Patent: Jun. 7, 1988

[54] METHOD FOR DETECTING AND CORRECTING FOR ISOTOPE BURN-IN DURING LONG-TERM NEUTRON DOSIMETRY EXPOSURE

[75] Inventor: Francis H. Ruddy, Monroeville, Pa.

[73] Assignee: The United States of America as represented by the United States Department of Energy, Washington, D.C.

[21] Appl. No.: 897,552

[22] Filed: Aug. 18, 1986

[51] Int. Cl.$^4$ .................................................. G01T 3/00
[52] U.S. Cl. .................................. 250/390; 250/391; 250/472.1; 376/154
[58] Field of Search ............ 250/390 C, 390 B, 472.1; 376/154, 159

[56] References Cited

U.S. PATENT DOCUMENTS

| | | | |
|---|---|---|---|
| 3,222,521 | 12/1965 | Einfeld | 250/83.1 |
| 3,436,538 | 4/1969 | Basdekas | 250/83.1 |
| 3,604,931 | 9/1971 | Kastner et al. | 250/390 B |

FOREIGN PATENT DOCUMENTS

1061535  5/1967  United Kingdom .

OTHER PUBLICATIONS

Khan, Nuclear Instruments and Methods, I13, No. 1, Nov. 1973, p. 55.
Fleischer et al., Science, vol. 149, Jul. 23, 1965, p. 383.
Frank H. Ruddy, et al., "Standardized Physics-Dosimetry for U.S. Pressure Vessel Cavity Surveillance Programs," *Fifth International ASTM-Euratom Symposium on Reactor Dosimetry*, Geesthacht, HEDL-SA-3095, Sep. 1984.

*Primary Examiner*—Janice A. Howell
*Assistant Examiner*—Jeffrey A. Nash
*Attorney, Agent, or Firm*—D. C. Abeles

[57] ABSTRACT

A method is described for detecting and correcting for isotope burn-in during-long term neutron dosimetry exposure. In one embodiment, duplicate pairs of solid state track recorder fissionable deposits are used, including a first, fissionable deposit of lower mass to quantify the number of fissions occuring during the exposure, and a second deposit of higher mass to quantify the number of atoms of for instance $^{239}$Pu by alpha counting. In a second embodiment, only one solid state track recorder fissionable deposit is used and the resulting higher track densities are counted with a scanning electron microscope. This method is also applicable to other burn-in interferences, e.g., $^{233}$U in $^{232}$Th or $^{238}$Pu in $^{237}$Np.

7 Claims, No Drawings

METHOD FOR DETECTING AND CORRECTING FOR ISOTOPE BURN-IN DURING LONG-TERM NEUTRON DOSIMETRY EXPOSURE

BACKGROUND OF THE INVENTION

The invention which is the subject of this application was created under a contract with the U.S. Department of Energy.

The invention relates to monitoring neutron fluence by dosimeters and, more particularly, to a method for detecting and correcting for "burn-in" or "ingrowth" of interfering fissioning isotopes during long-term fission rate measurements for neutron dosimetry purposes.

Federal regulations require that nuclear reactor coolant pressure boundaries have sufficient margin to ensure that the boundary behaves in a non-brittle manner when stressed under operating, maintenance, testing, and postulated accident conditions, and that the probability of rapidly propagating fracture is minimized. These requirements necessitate prediction of the amount of radiation damage to the reactor vessel throughout its service life, which in turn requires that the neutron exposure to the pressure vessel be monitored.

Recent development of ultralow-mass fissionable deposits for solid state track recorders has made possible many new applications of the solid state track recorder technique, such as monitoring light water reactor pressure vessels and support structures related thereto. Solid state track recorders with fissionable deposit pairs can be inserted in "sets" into light water reactors to monitor the neutron fluence via observations of neutron induced fission rates with the solid state track recorders. An example of a typical neutron dosimetry "set" is the following fissionable deposits:

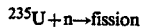

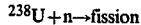

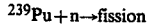

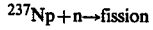

Since each of these four isotopes of the set has a different response as a function of neutron energy, inclusion of all four leads to information on the energy distribution of the neutrons, as well as the intensity of the neutron dose.

At high neutron fluences, a complication can arise due to competing neutron-induced reactions. An example is the following:

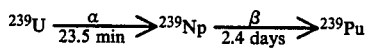

Thus, during a long irradiation or a very intense irradiation, $^{239}$Pu will be formed within a $^{238}$U dosimeter via the above reaction (referred to as neutron capture). If a large enough amount of $^{239}$Pu is formed, the fission rate of the $^{238}$U dosimeter will be increased, because the $^{239}$Pu itself undergoes fission. The growth of $^{239}$Pu during an irradiation is what is known as the burn-in or ingrowth, and the elimination of its contribution to the total fission rate of the dosimeter is known as the "burn-in correction."

More particularly, it is contemplated that solid state track recorder dosimetry can be used in commercial light water reactors for periods as long as 25 effective full-power years. During such long exposure times, the burn-in of isotopes which can contribute to the overall observed fission rate becomes an important consideration. As suggested above, an example of this problem is the burn-in of $^{239}$Pu in $^{238}$U deposits during exposure, with the resulting addition of $^{239}$Pu fission to the observed $^{238}$U fission rate. During an operating cycle for a typical light water reactor, it has been observed that the total fast neutron fluence (E>1 MeV) in the reactor cavity is $4 \times 10^{16}$n/cm$^2$ with an accompanying thermal flux of $2.7 \times 10^{15}$n/cm$^2$. For 25 effective full-power years, the total fluences are $1.7 \times 10^{18}$n/cm$^2$ (E>1 MeV) and $1.1 \times 10^{18}$n/cm$^2$ thermal.

The number of plutonium atoms produced, i.e., $N_{Pu}$, in a uranium deposit containing $N_U$ uranium atoms is:

$$N_{Pu} = N_U \phi \sigma_{n,\gamma}$$

where $\phi$ is the thermal neutron fluence and $\sigma_{n,\gamma}$ is the neutron capture cross section for $^{238}$U to produce $^{239}$U which decays to $^{239}$Pu. Since this cross section is about 50 barns, for 25 effective full-power years the result is:

$$\begin{aligned} N_{Pu}/N_U &= (1.1 \times 10^{18}\text{cm}^{-2})(50 \times 10^{-24}\text{cm}^2) \\ &= 5.50 \times 10^{-5} \\ &= 55 \text{ ppm} \end{aligned}$$

Averaged over the entire irradiation and using cross section information derived for light water reactor cavity surveillance, one can calculate that this amount of $^{239}$Pu burn-in will contribute about 2% to the overall observed fission rate. Although a 2% correction is not a major problem, only a slight increase in $^{239}$Pu burn-in can compromise the 3-5% accuracy for light water reactor surveillance that is required and even a 2% increase in the observed fissions should not go uncorrected.

In light of the above, a method is needed for detecting and correcting for burn-in to ensure more accurate neutron fluence measurements during long-term neutron fluence dosimetry.

To this end, this application describes a method for directly detecting the amount of, e.g., $^{239}$Pu, that has burned-in. If $^{239}$Pu is contained in the same set of dosimeters, knowledge of the fission rate of the $^{239}$Pu dosimeter, plus knowledge of the amount of $^{239}$Pu in the $^{238}$U dosimeter, allows the burn-in correction to be made for the $^{238}$U dosimeter.

SUMMARY OF THE INVENTION

Accordingly, it is an object of the present invention to provide a method for detecting and correcting for isotope burn-in during long term neutron dosimetry exposure, which is simpler and characterized by a much higher inherent accuracy than the previously known methods.

It is another object of the present invention to provide a method for detecting and correcting for isotope burn-in during long term neutron dosimetry exposure capable of being used for both production of low mass fissionable deposits and for detection and quantification of burn-in.

To achieve the foregoing and other objects of the present invention, and in accordance with the purposes of the invention, there is provided a method for detecting burn-in of interfering fissioning isotopes during long-term solid state track recorder fission rate measurements for neutron dosimetry purposes. In a first embodiment, duplicate pairs of solid state track recorder fissionable deposits are used, including a first fissionable deposit of lower mass to quantify the number of fissions occuring during the exposure, and a second deposit of higher mass to quantify the number of atoms of $^{239}$Pu by alpha counting. In a second embodiment, only one solid state track recorder fissionable deposit is used and the resulting higher track densities are counted with a scanning electron microscope.

DETAILED DESCRIPTION OF THE PREFERRED EMBODIMENTS

The preferred embodiments according to the present invention will now be described.

An ultralow-mass fissionable deposit with a mass of 100 nanograms of uranium is subjected to the irradiation described above, resulting for instance in the production of 55 ppm of $^{239}$Pu. The $^{239}$Pu produced will result in an alpha disintegration rate of 0.8 dpm (decays per minute). In order to measure the amount of $^{239}$Pu that is present to an accuracy that is sufficient to make the required correction, the uranium deposit undergoes alpha counting.

The alpha counting is done for instance in an alpha spectrometer where the characteristic energy signature of these alpha decays can be recognized for the counting. More particularly, the uranium deposit is counted in a low background $2\pi$ alpha counter, involving a count rate that is as low as for instance 0.02 cpm (counts per minute), for about four hours.

Such counters are known in the art. A $2\pi$ proportional counter, a thin window alpha proportional counter and a lithium drifter silicon detector are examples of known counters suitable for this purpose.

Thus, after a $^{238}$U/solid state track recorder combination is used in a reactor for a year, the combination can be pulled out of the reactor. The solid state track recorder is then analyzed to measure the number of fissions which gives a fission rate. In order to determine whether the fissions came from $^{238}$U or from the $^{239}$Pu ingrowing into the dosimeter (i.e., burn-in), the fissionable deposit of $^{238}$U is put into an alpha counter and the characteristic peak in the energy spectrum of the decay of $^{239}$Pu is sought to be identified. Then, once it is observed how much $^{239}$Pu is present based on the amplitude of the peak, one can calculate whether or not the $^{239}$Pu contributed significantly to the fission rate, and by how much. That is, the fission rate for $^{239}$Pu is already known and can be used to calculate the fission rate of $^{238}$U.

Although burn-in corrections much greater than the 2% suggested above are not anticipated for light water reactor cavity surveillance, the use of solid state track recorders and ultralow-mass fissionable deposits in other reactor locations, such as in a surveillance capsule, is also possible. Fluences greater than $10^{19}$n/cm$^2$ occur at these locations, resulting in proportionately higher burn-in.

In practice, two embodiments of the method according to the present invention are used for burn-in detection and correction, as will now be described.

In a first embodiment, duplicate pairs of solid state track recorder fissionable deposits are exposed to the same neutron flux-time history, for instance, by being located at the same position in the neutron field for the same long-term period of exposure. A lower mass deposit is used to quantify the number of fissions occurring during the exposure, and a higher mass deposit is used to quantify the number of atoms of $^{239}$Pu by alpha counting.

In a second embodiment, only one solid state track recorder fissionable deposit is used and the resulting higher track densities are counted with a scanning electron microscope.

The method according to the present invention is also applicable to other burn-in interferences, e.g., $^{233}$U in $^{232}$Th or $^{238}$Pu in $^{237}$Np.

The outstanding advantages of the method according to the present invention when compared to other methods lies in its simplicity and inherent high accuracy. In addition, the same methods and equipment that are used for production of ultralowmass fissionable deposits can also be used for the detection and quantification of burn-in.

The foregoing is considered illustrative only of the principles of the invention. Further, since numerous modifications and changes will readily occur to those skilled in the art, it is not desired to limit the invention to the exact construction and operation shown and described. Accordingly, resort may be had to all suitable modifications and equivalents falling within the scope of the invention and the appended claims as would be understood within the art.

I claim:

1. A method for detecting and correcting for isotope burn-in of an interfering isotope in a fissionable deposit of a selected fissionable isotope during long-term exposure for neutron field dosimetry, wherein the interfering deposit has a known fission rate, the method comprising the steps of:
    (a) exposing the fissionable deposit to the neutron field for the long-term exposure;
    (b) determining the amount of the interfering isotope present in the fissionable deposit after the long-term exposure; and
    (c) using the known fission rate of the interfering isotope and the determined amount of the interfering isotope to determine the contribution to the total number of fissions of the fissionable deposit from the burn-in of the interfering isotope during the long-term exposure.

2. The method as recited in claim 1, wherein the interfering isotope is $^{239}$Pu and the fissionable deposit is of $^{238}$U.

3. The method as recited in claim 1, wherein the interfering isotope is $^{238}$Pu and the fissionable deposit is of $^{237}$Np.

4. The method as recited in claim 1, wherein the interfering isotope is 233U and the fissionable deposit is of $^{232}$Th.

5. The method as recited in claim 1, further comprising the steps of:
    (d) providing the fissionable deposit on a solid state track recorder for the long-term exposure:
    (e) counting the number of tracks in the solid stare track recorder after the long-term exposure; and (f) correcting the counted value thereof as needed, by the contribution by the burn-in of the interfering isotope to provide any predetermined accuracy in determining the value of the fluence of the neutron field during the long-term exposure.

6. The method as recited in claim 1, further comprising the steps of:

(d) exposing a further fissionable deposit of lower mass to said neutron field during the longterm exposure, at the same location; and
(e) employing the further fissionable deposit to determine the number of fissions in the further fissionable deposit during the long-term exposure.

7. The method as recited in claim 6, further comprising the step of providing each fissionable deposit on a respective solid state track recorder prior to the exposing of step (a).

* * * * *